Sept. 26, 1939.                S. HOLTZCLAW                2,174,419
                            FOOT THROTTLE ACTUATOR
                              Filed Feb. 14, 1938
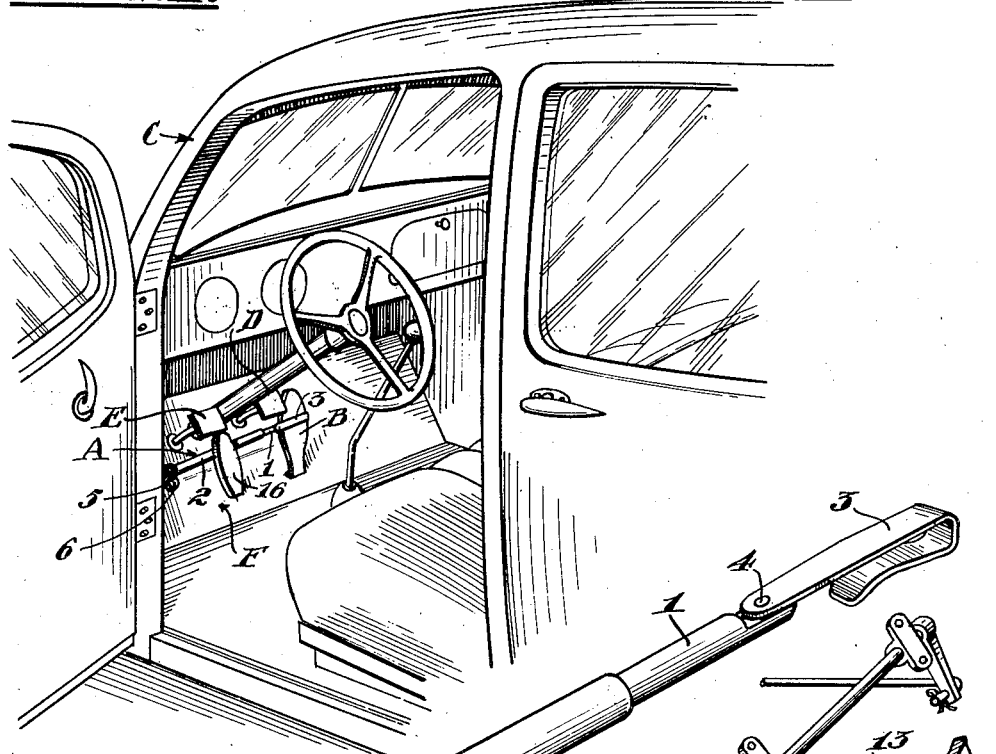
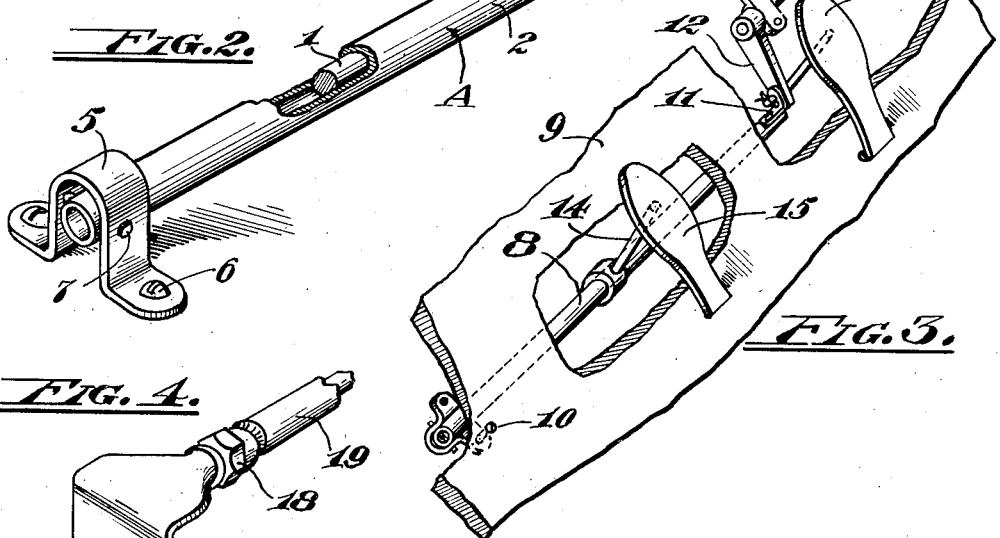
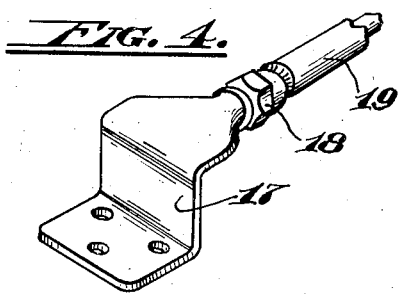
Inventor
Sidney Holtzclaw
By
Attorney.

Patented Sept. 26, 1939

2,174,419

UNITED STATES PATENT OFFICE 2,174,419

FOOT THROTTLE ACTUATOR

Sidney Holtzclaw, Glendale, Calif.

Application February 14, 1938, Serial No. 190,359

7 Claims. (Cl. 74—478)

This invention relates to and has for an object the provision of an actuator by means of which the foot throttle or accelerator of an automobile or like motor vehicle may be more conveniently operated with either foot under all driving conditions, whereby to relieve the strain of constant accelerator operation with one foot and enhance driving comfort.

An object of this invention is to provide an actuator of the character described which is connected with and extended to one side, preferably to the left, of the accelerator pedal or button and is disposed in such position that the driver may operate it with the left foot without appreciably moving said foot from the usual rest position or the usual clutch pedal engaging position, or may operate it with the right foot when the latter is in a rest or other position to the left of the accelerator proper.

Another object is to provide an actuator of the character described which may be readily attached to the accelerators of various makes of motor vehicles and also easily adjusted to change the length and position thereof to suit the particular operator or vehicle.

I have shown in the accompanying drawing a preferred form of foot throttle actuator embodying my invention, subject, however, to modification, within the scope of the appended claims, without departing from the spirit of my invention.

Referring to the drawing:

Fig. 1 is a fragmentary perspective view of an automobile, as when equipped with the accelerator or actuator of this invention;

Fig. 2 is a perspective view of the actuator with the pedal thereof removed;

Fig. 3 is a fragmentary perspective view of a modified form of the actuator;

Fig. 4 is a fragmentary perspective view of another modified form of the invention.

The embodiment of the invention shown in the accompanying drawing, generally comprises a relatively long and comparatively simple and inexpensive actuating device A which is connected with the foot throttle or accelerator B of an automobile C and extended therefrom to lie below the plane and in front of the brake pedal D and clutch pedal E. Thus arranged the actuator may be conveniently operated with either foot as an auxiliary accelerator. Although but a slight movement of either foot from the normal operating or rest position is required to operate the actuator, yet, due to the length of the actuator, it may be operated with either foot in any one of several positions over a wide range, to best suit the particular driver and to afford relief from foot and leg strain as occasioned in operating the ordinary accelerator with one foot disposed in the same position at all times.

It is noted that the construction and arrangement of the actuator permits of an advantageous operation thereof when installed in various positions other than here shown, and in all instances without interfering with the normal operation of the brake and clutch pedals, the accelerator proper and other controls of the automobile.

More specifically the actuator A, as here shown, comprises a bar, rod or lever-like elongated body which may be made up of telescopically or otherwise relatively adjustably joined sections 1 and 2 for varying the length thereof. Arranged at or adjacent one end of this body is suitable means for attaching it to the accelerator pedal B, or associated elements, whereas at or adjacent its other end, is a pivotal or hinge means adapted to be secured to a floor board F or some other suitable part of the automobile. As here shown the means for attaching the actuator bar or body to the accelerator consists of a spring clip 3 pivoted as at 4 to the section 1 and adapted to detachably grip or fit upon the pedal of the accelerator B, as indicated in Fig. 1, and in such manner that upon depressing the actuator body, said accelerator will be actuated. The pivot 4 permits the angle of extension of the body from the accelerator pedal to be varied as desired, to suit the particular automobile or driver.

The pivotal or hinge means for securing the body of the actuator A to the floor board F includes an inverted U-shaped bracket 5 secured in place by fastenings 6 and secured to the body section 2 by means of the pin 7 on which said body fulcrums when actuated to operate the accelerator. It should be noted that the upper side of the body adjacent the end secured to the accelerator pedal is substantially coplanar with said pedal, but that said body is downwardly inclined towards the pivoted end thereof. This will dispose the actuator close to the floor boards to avoid interference with the clutch and brake pedal, but said body has sufficient clearance to permit of such depression thereof towards said floor as necessary to fully operate the accelerator B.

The sections 1 and 2, in being relatively extensible, facilitate the installation of the device on various makes of automobiles and types of motor vehicles, and also provide for lengthening or shortening the lever-like body or bar of the actuator to suit the particular driver. As shown in Fig. 3 I may provide an actuator wherein the body or bar 8, corresponding to the one shown in Figs. 1 and 2, is mounted beneath the floor boards 9. In this form of the invention the bar 8 is secured at one end to the under side of said floor board as at 10, and at its other end is connected by the fastening means 11 to the accelerator crank arm 12 which is actuated by the accelerator pedal 13.

Means is provided for depressing said bar from above the floor, whereby to operate said bar in the same manner as the bar in Figs. 1 and 2. As here shown this means includes an arm 14 extending upwardly from the bar 8 thru the floor boards in position to be depressed with either foot. If desired the arm 14 may be operated by a pedal 15. In this connection it should be noted that the body or bar of the actuator shown in Fig. 1 may, if desired, be provided with a pedal 16 adjustable axially thereof in any suitable manner to facilitate the depression of the body at various points in its length, to thereby actuate the accelerator.

It is now seen that in both forms of the invention here shown and described the actuator is characterized by an elongated body or bar which is connected to and extended from one side of the foot throttle or accelerator device of an automobile and disposed so that at least a portion thereof is adapted to be depressed to actuate the accelerator.

In Fig. 4 I have shown a modified form of pivotal mounting which includes a bracket 17 and a suitable universal joint 18 between the bracket and the body or bar 19 of the actuator. This will provide for added freedom of movement of the actuator and reduce friction so that a smoother and easier operation is made possible.

I claim:

1. An actuator for the foot throttle or accelerator of an automobile including an actuating bar, means at one end thereof for detachably securing the bar to the foot throttle or accelerator of an automobile with said bar extending to one side of said foot throttle, means for pivotally securing the other end of said bar to the automobile, said bar being downwardly inclined from the end attached to the accelerator towards its pivoted end and arranged to be depressed by the feet of the driver of the automobile for operating said accelerator.

2. An actuator for the foot throttle or accelerator of an automobile comprising an elongated member, means for securing said member to the foot throttle or accelerator of an automobile with said member extending laterally from said foot throttle and arranged to be depressed by the feet of the driver at points between its ends, and means for pivotally connecting the other end of the bar with the automobile.

3. An actuator for the foot throttle or accelerator of an automobile comprising an elongated member, means for securing said member to the foot throttle or accelerator of an automobile with said member extending laterally from said foot throttle and arranged to be depressed by the feet of the driver at points between its ends, and means for pivotally connecting the other end of the bar with the automobile, and a pedal mounted on said bar between the ends thereof.

4. An actuator for the foot throttle or accelerator of an automobile comprising a bar including relatively extensible sections, means for securing the outer end of one of the sections to the accelerator or foot feed of an automobile and means for pivotally connecting the outer end of the other section with a stationary part of the automobile.

5. An actuator for operating the foot throttle or accelerator of an automobile comprising a bar, means for connecting one end of said bar with the accelerator or foot throttle of an automobile and providing for pivotal movement of the bar relative to said foot throttle to vary the angle of extension of the bar from said throttle, and means for pivotally securing the other end of the bar to a stationary part of the automobile.

6. The combination with an automobile having an accelerator or foot throttle and clutch and brake operating pedals mounted on the floor thereof, of an accelerator, a bar connected with and extending from one side of said accelerator in front and below the plane of said clutch and brake pedals, and means for pivotally connecting the other end of said bar to said floor, with said bar elevated from the floor and arranged to be depressed by the feet of the driver.

7. The combination with an automobile having an accelerator or foot throttle and clutch and brake operating pedals mounted on the floor thereof, of an accelerator, a bar connected with and extending from one side of said accelerator in front and below the plane of said clutch and brake pedals, and means for pivotally connecting the other end of said bar to said floor, with said bar elevated from the floor and arranged so that it may be depressed when engaged by either foot of the driver at various points throughout its length.

SIDNEY HOLTZCLAW.